Figure 3:
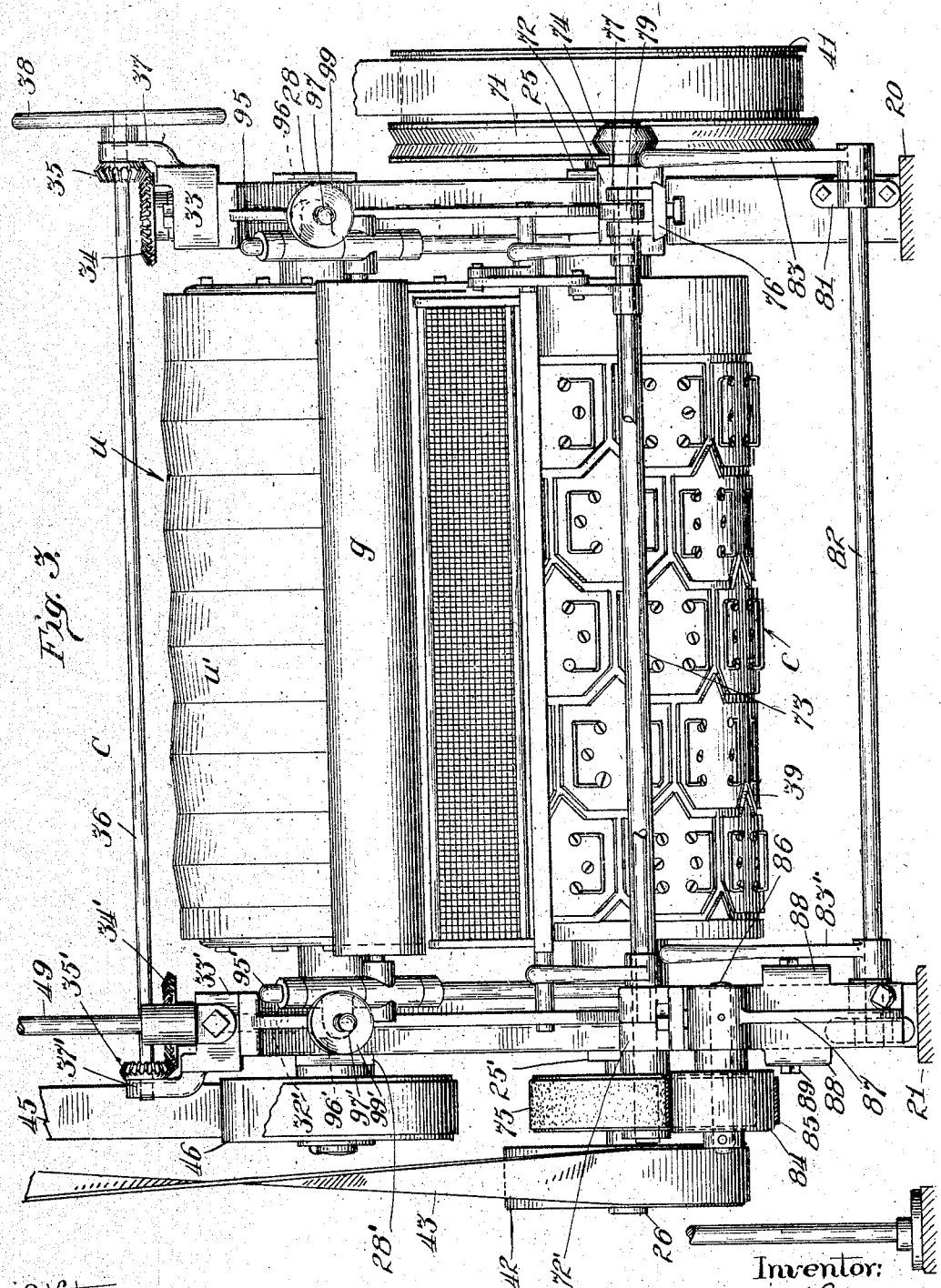

S. H. GOLDBERG.
PATTERN CUTTING AND ARRANGING MACHINERY.
APPLICATION FILED DEC. 26, 1912.
1,176,049.
Patented Mar. 21, 1916.
9 SHEETS—SHEET 1.
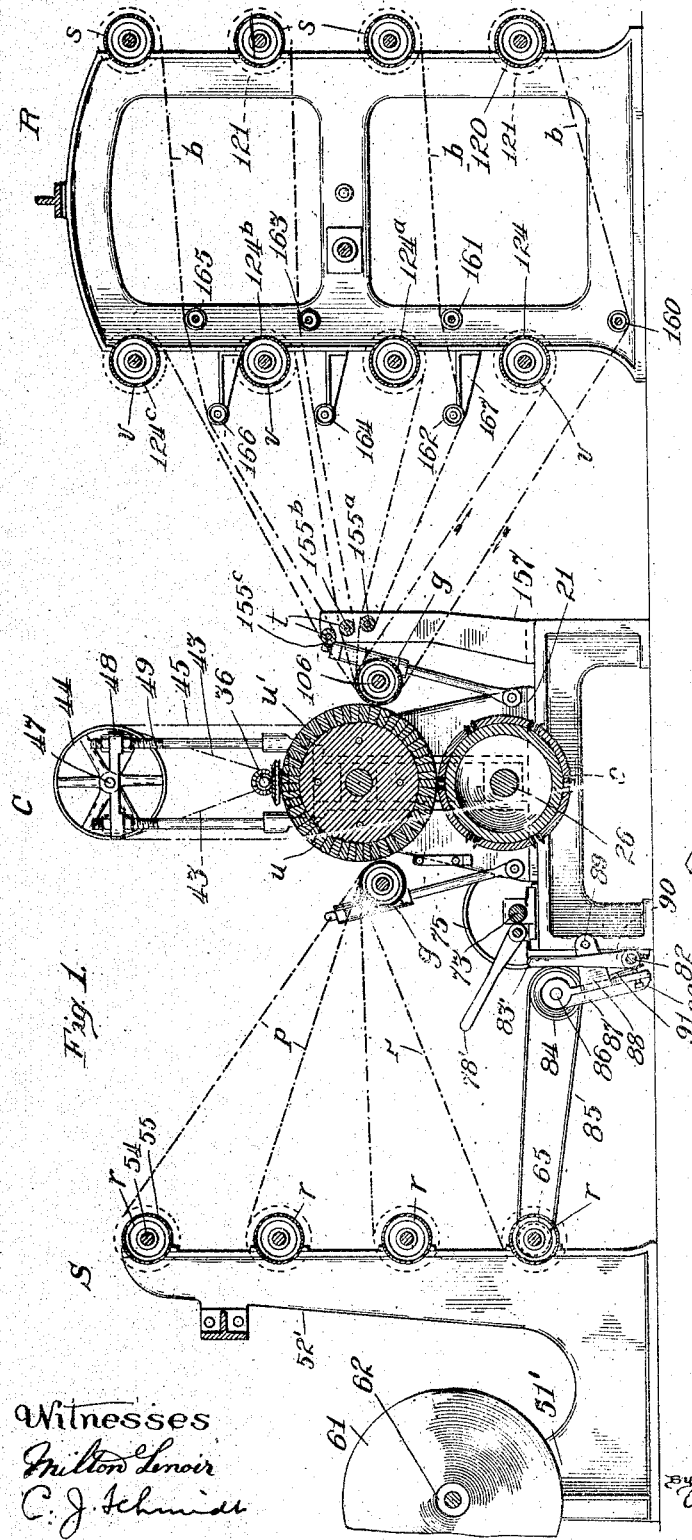
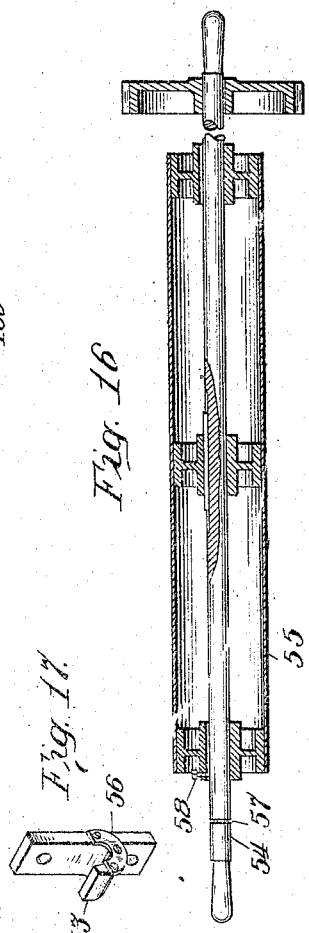
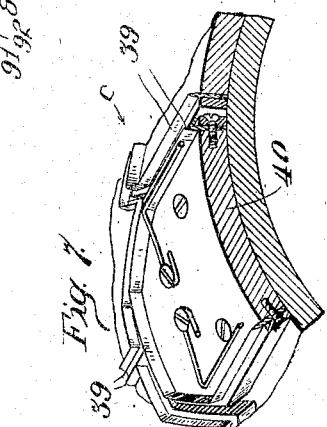
Witnesses
Inventor
Soloman H. Goldberg

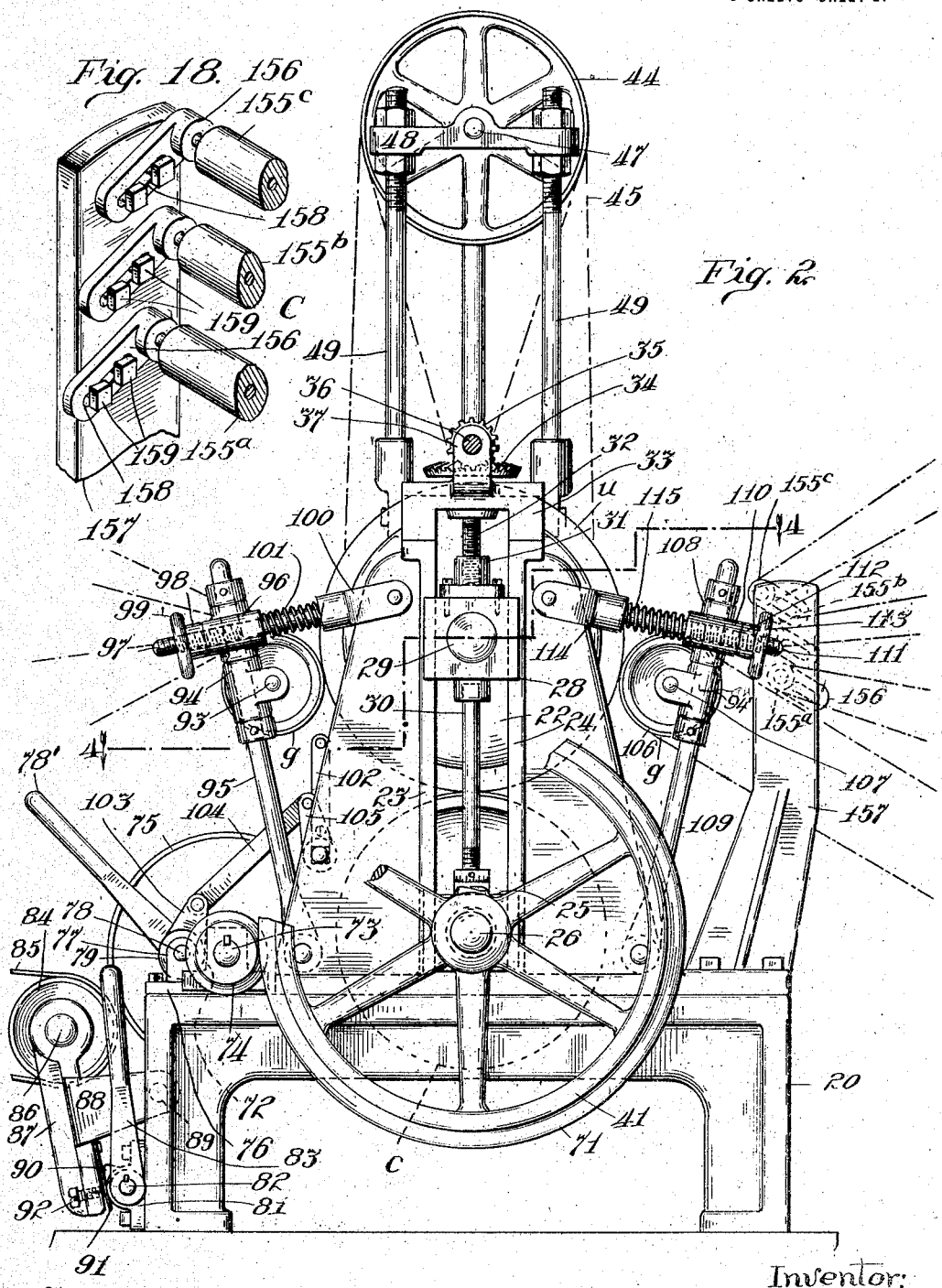

S. H. GOLDBERG.
PATTERN CUTTING AND ARRANGING MACHINERY.
APPLICATION FILED DEC. 26, 1912.

1,176,049.

Patented Mar. 21, 1916.
9 SHEETS—SHEET 3.

Witnesses:
Milton Lenoir
C. J. Schmidt

Inventor:
Solomon H. Goldberg
By Offield, Towle, Graves & Offield
Attorneys.

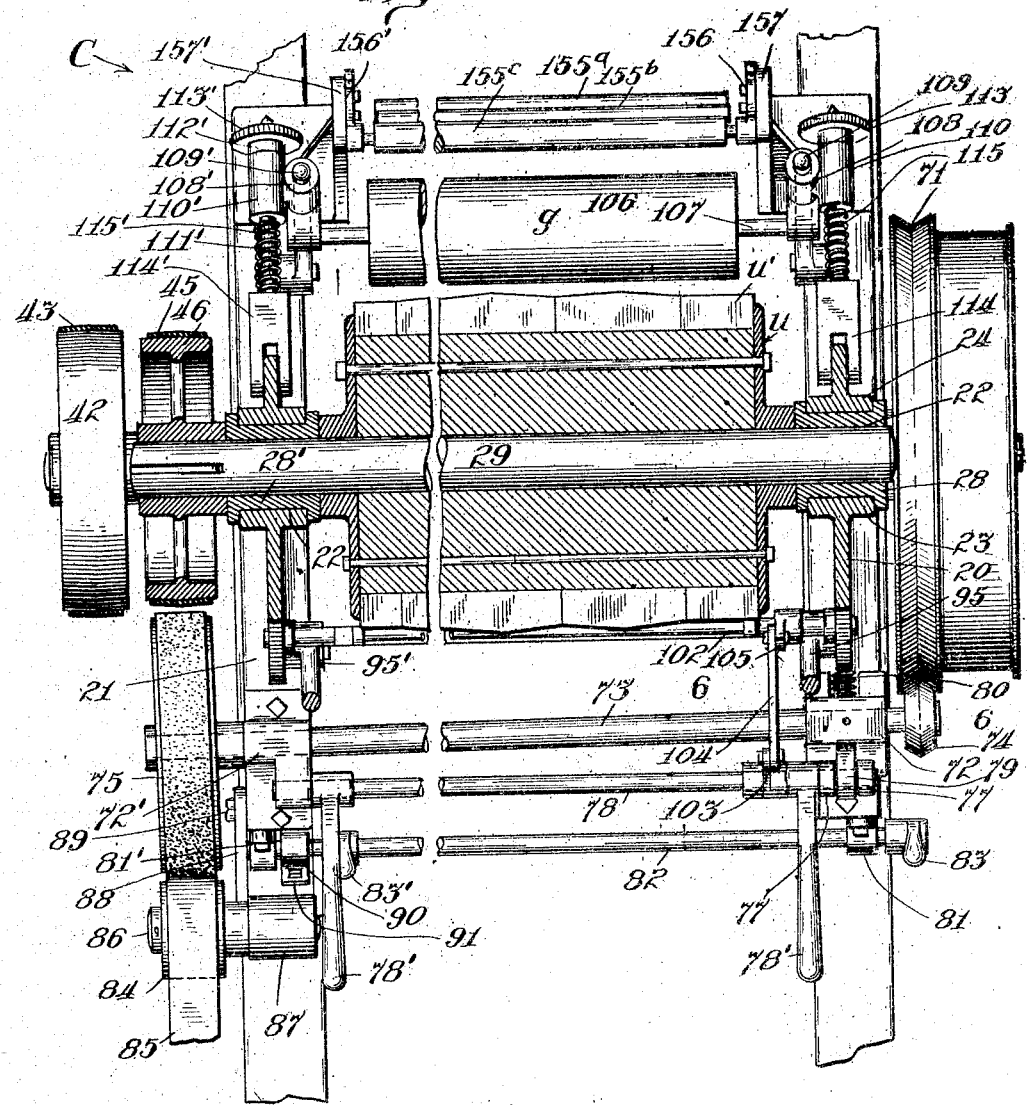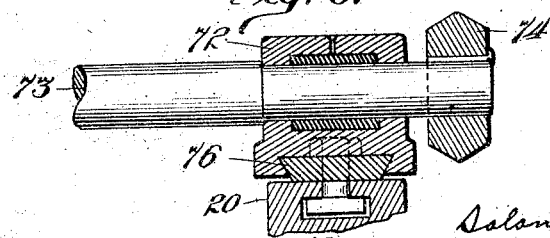

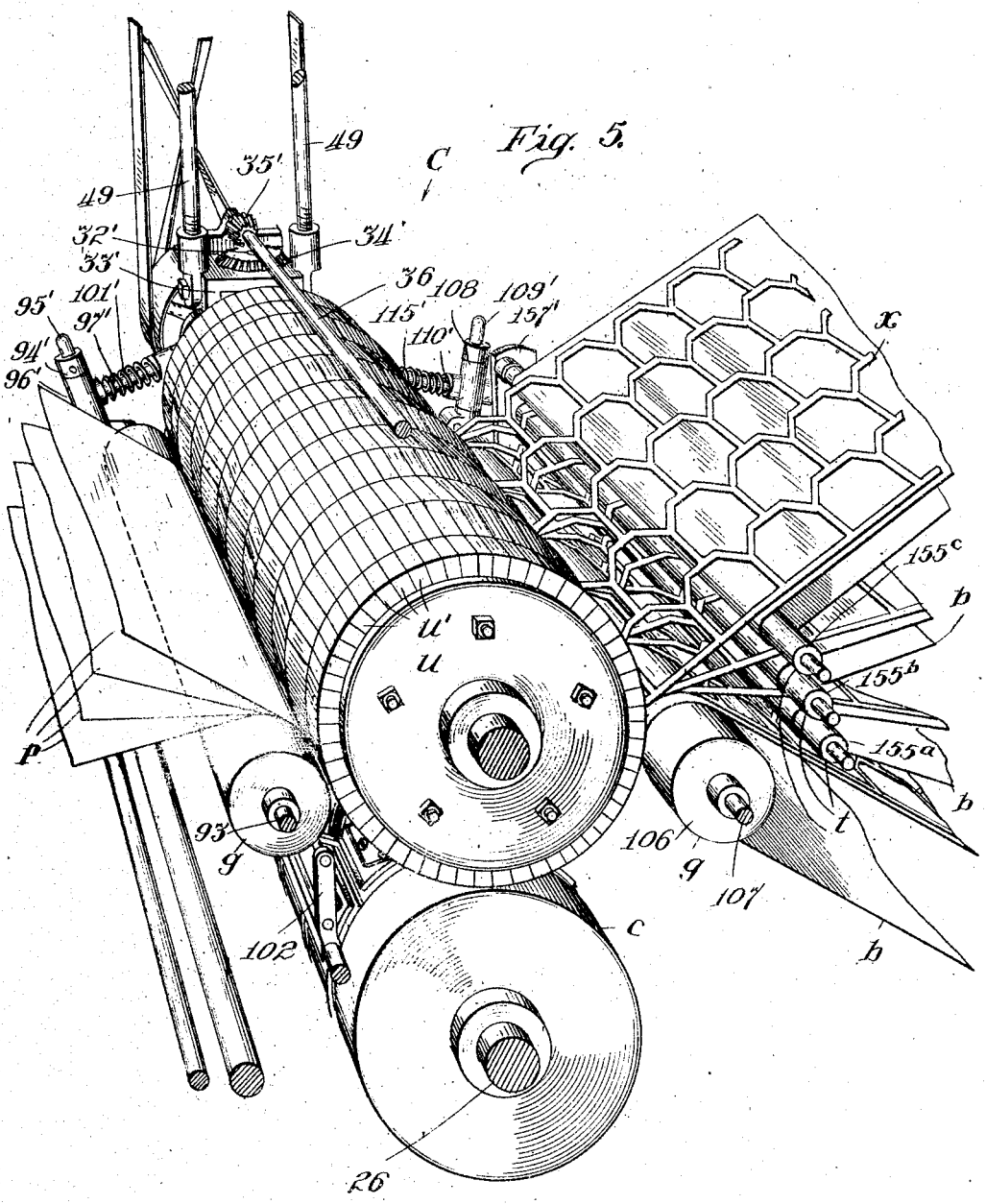

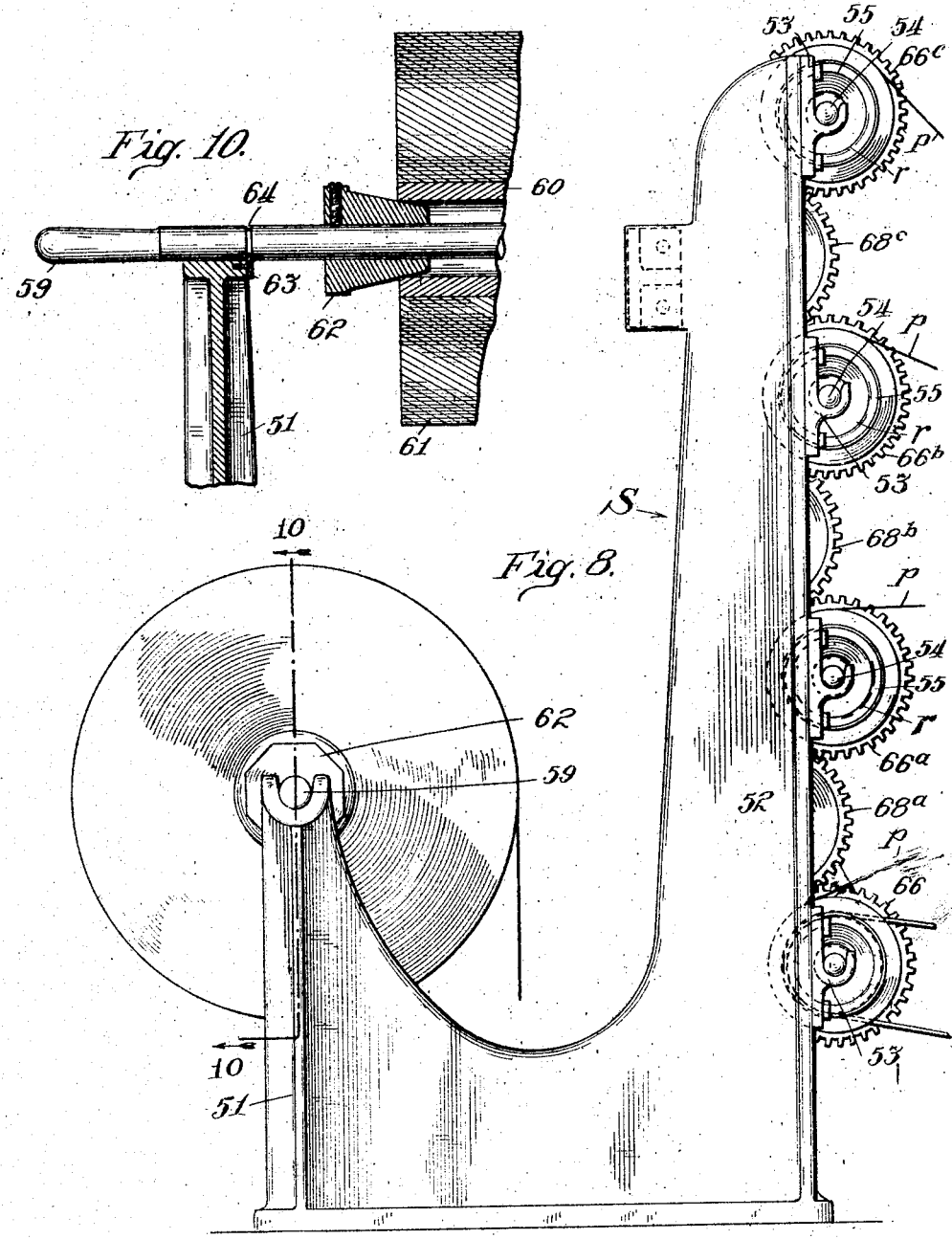

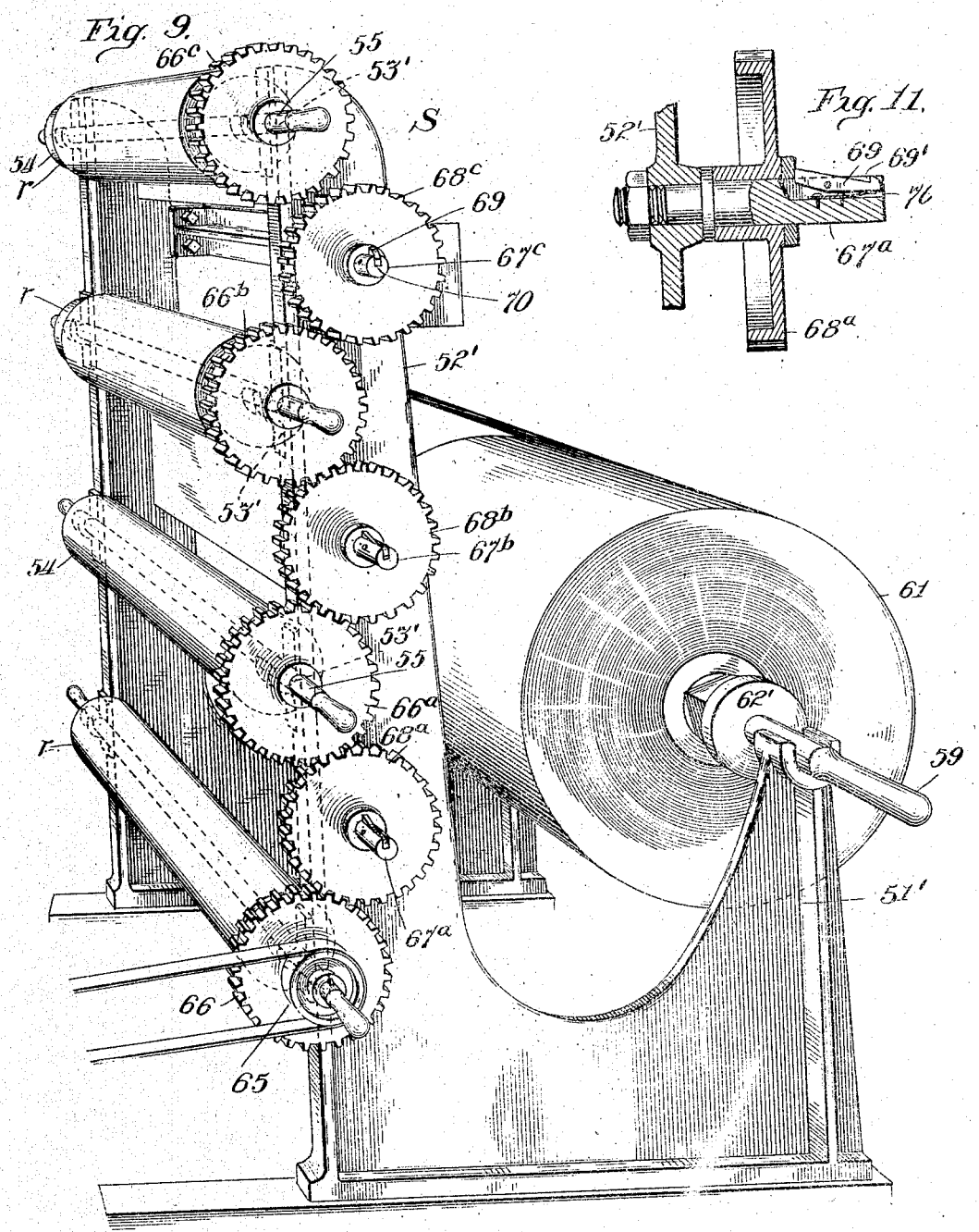

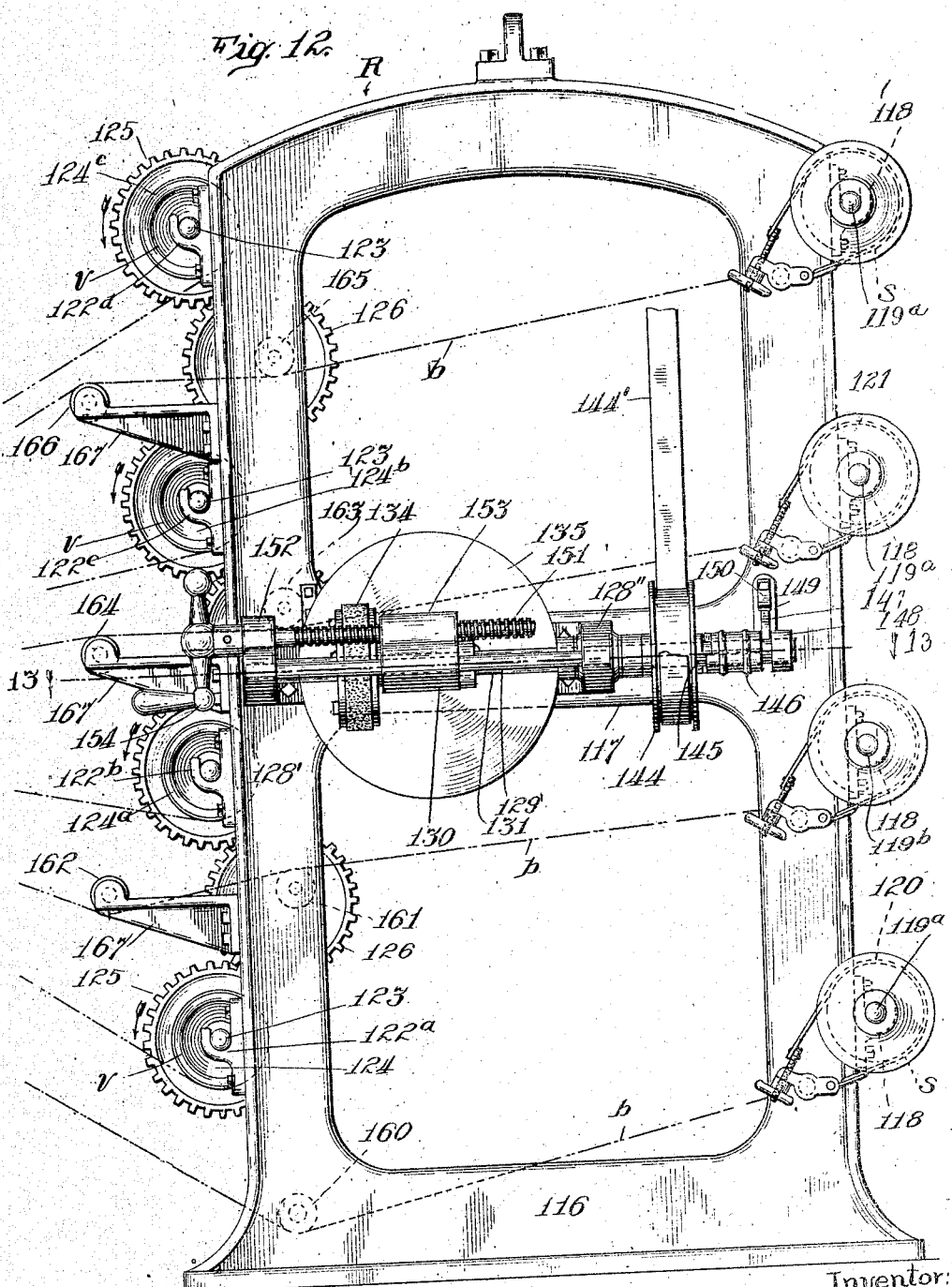

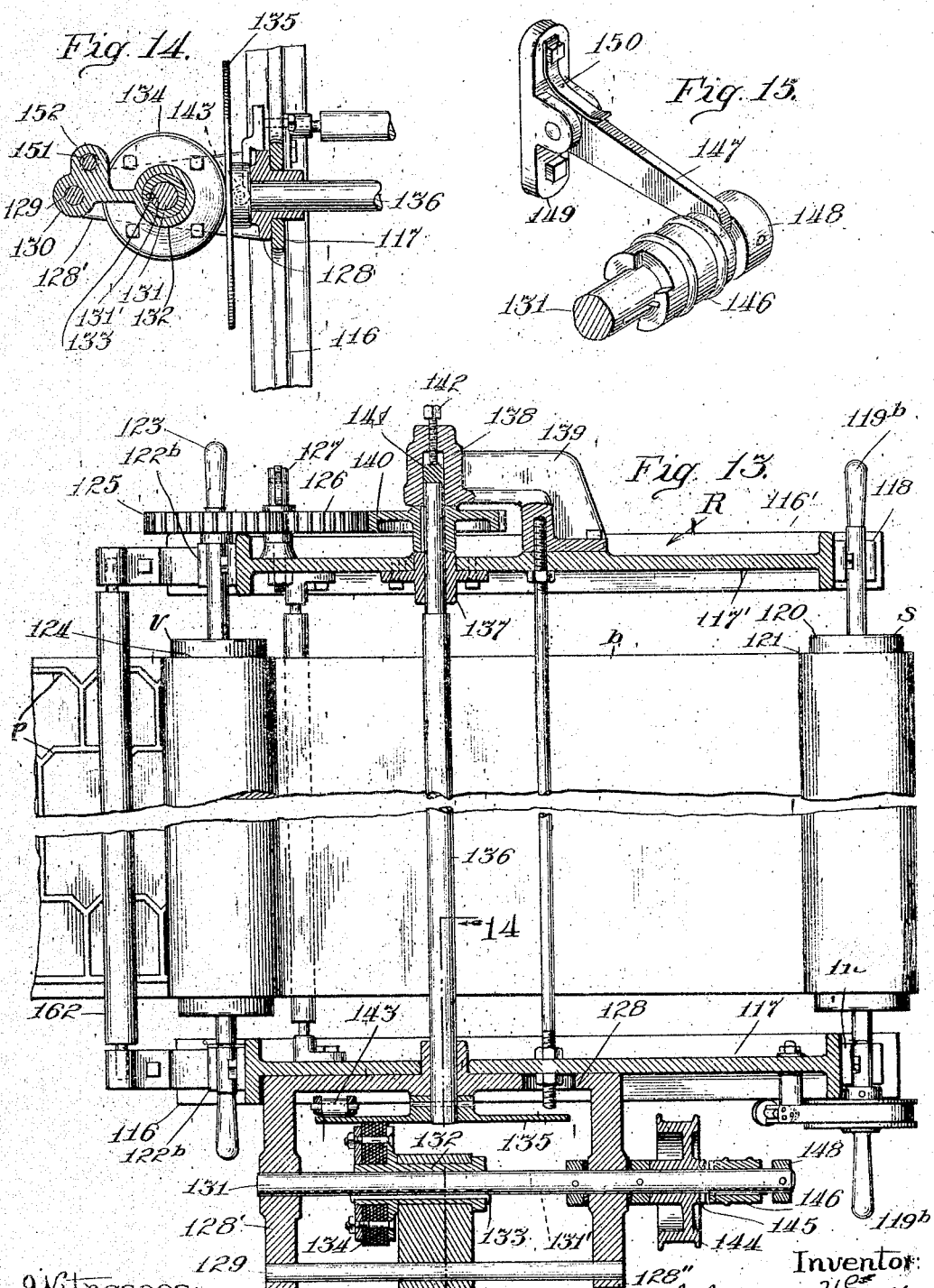

UNITED STATES PATENT OFFICE.

SOLOMON H. GOLDBERG, OF CHICAGO, ILLINOIS, ASSIGNOR TO THE WEST COAST ROOFING AND MANUFACTURING COMPANY, OF CHICAGO, ILLINOIS, A CORPORATION OF ILLINOIS.

PATTERN CUTTING AND ARRANGING MACHINERY.

1,176,049. Specification of Letters Patent. Patented Mar. 21, 1916.

Application filed December 26, 1912. Serial No. 738,611.

*To all whom it may concern:*

Be it known that I, SOLOMON H. GOLDBERG, of the city of Chicago, in the county of Cook and State of Illinois, have invented certain new and useful Improvements in Pattern Cutting and Arranging Machinery, of which the following is a specification.

My invention relates to machinery for cutting continuous patterns and for applying supporting means thereto for protecting the same until they are to be used.

My invention is particularly adaptable for producing and arranging patterns to be used in connection with the manufacture of roofing of the class in which lengths of flexible material, such as felt, are saturated with asphalt or other material, and a surfacing of gravel, sand or the like applied thereto. In this class of roofing it is desirable to produce a more ornamental effect, as for example to imitate shingling or tiling. Such effect has heretofore been produced by coloring or by depressing alternate sections of the surfacing to give the desired effect. In a companion application Serial No. 738,612, filed Dec. 19, 1912, I have described a new and improved method for obtaining such ornamental effect. This method consists in applying to the asphalt or other surface, before application of the surfacing material thereto, a flexible continuous pattern of skeleton form, and after such application of the pattern applying the surfacing material, which surfacing material will adhere to the spaces of the asphalt surface uncovered by the pattern but will fall away from the areas over which the pattern is applied, these uncovered spaces being representative of the outlines of shingles or tiles.

One of the important objects of the invention in this application is to provide simple and improved mechanism by means of which a plurality of pattern lengths can be cut simultaneously. Thin paper stock is preferably used, and after the greater part of the stock is cut away, the resulting pattern lengths consist of interconnected narrow ribbons and are very light and can easily become displaced or torn if they are laid by hand on the roofing stock which is to be surfaced. As described in the method of my co-pending application referred to, the pattern lengths are fed continuously to the roofing stock from rolls of heavier paper between whose turns the delicate pattern lengths are accurately and smoothly held. The supporting or backing does not leave the delicate pattern lengths until they have been accurately and smoothly applied to the roofing stock, the result being that the pattern ribbons will adhere smoothly and accurately to the roofing stock in the proper manner.

Another object of the invention in this application is to provide improved mechanism for superposing on backing paper lengths the delicate pattern lengths as they emerge from the cutting mechanism and to roll each of such pattern lengths together with its backing paper length into a roll, which rolls can be stored away until they are to be applied to the surfacing machine to deliver the pattern lengths to the roofing material.

Another object of the invention is to provide for the simultaneous cutting of a plurality of superposed pattern stock lengths so that a desired quantity of pattern lengths can be quickly produced.

Another object is to provide improved pattern stock feeding mechanism adapted to support rolls of pattern paper stock and to provide means for quickly refilling the paper supply rolls when they are empty.

Another object of the invention is to provide improved means for driving in-take rolls for receiving the backing paper and the pattern lengths, and improved means are provided for accurately adjusting for the proper speed of the in-take rolls with relation to the speed of travel of the pattern lengths through the cutting mechanism.

In general the object of the invention is to provide improved cutting mechanism, pattern stock supplying mechanism and roll up mechanism, all coöperating to accurately and quickly cut a plurality of paper bands to form pattern lengths, and to wind up each pattern length together with a band of protecting paper in a roll, the rolls to be used in connection with coating machinery to deliver the pattern strips to the roofing stock and to accurately position the lengths thereon.

Machinery embodying the various features of the invention is illustrated on the accompanying drawings, in which drawings—

Figure 1 shows the pattern stock supporting structure, the pattern cutting structure and the rolling up structure all arranged i .

coöperative relation, these structures being in vertical section; Fig. 2 is a side elevational view of the pattern cutting structure; Fig. 3 is a front elevational view of the pattern cutting structure; Fig. 4 is a sectional view looking from plane 4—4, Fig. 2; Fig. 5 is a perspective view showing particularly the coöperation of the pattern stock feeding mechanism and pattern rolling-up mechanism with the cutting mechanism; Fig. 6 is an enlarged detailed view of certain friction clutch mechanism; Fig. 7 is an enlarged detailed view of a section of the cutting drum showing the arrangement of the cutting knives; Fig. 8 is an enlarged side elevational view of the pattern stock rolls and supporting structure; Fig. 9 is a perspective view of the pattern stock supply support structure; Fig. 10, is a sectional view taken from plane 10—10, Fig. 8; Fig. 11 is an enlarged diametral sectional view showing mechanism for effecting meshing and unmeshing of gears of the pattern stock supporting structure; Fig. 12 is an enlarged side elevational view of the rolling up mechanism; Fig. 13 is a sectional view taken on plane 13—13, Fig. 12; Fig. 14 is a sectional view taken on plane 14—14, Fig. 13; Fig. 15 is an enlarged perspective view of clutch mechanism forming part of the rolling-up structure; Fig. 16 is a diametral sectional view of one of the rolls for receiving the pattern band and its supporting paper bands; Fig. 17 is a perspective view of one of the supporting bearings for preventing endwise play of the various roll supporting cores; and Fig. 18 is an enlarged perspective view showing adjustable bearing frames for distributing rolls.

The machinery comprises the pattern cutting structure C, the pattern stock supporting structure S and the rolling-up structure R. Describing in general the construction and operation, the pattern stock structure comprises a plurality of rolls or cylindrical cores $r$ in each of which a continuous band of pattern material is wound. The various pattern blank bands $p$ pass over a guide roller $g$ and then between an upper abutment roll $u$ and a lower cutting roll $c$ of the cutting structure, this cutting roll having applied to its periphery suitable knife blades arranged to cut suitable designs in the pattern band blanks. On the roll up structure R are mounted on the outer end the backing paper stock rolls $s$ and on the inner side are mounted the pattern take-up rolls $t$, the paper bands $b$ coming from the stock rolls and passing about rollers $t$ and then to the respective take-up rolls $v$. The various pattern lengths as they emerge from the cutting structure are fed to the respective take-up paper bands and together with such bands are wound about the take-up rolls $v$, the otherwise flimsy pattern lengths being thus smoothly and securely held between the layers of the paper on the rolls $b$, and these rolls are applied to the covering machine where the pattern is fed to and caused to adhere to the treated roofing material which upon passage through the covering machine will retain gravel, sand, or other covering material but will shed such material from the areas covered by the smooth pattern stock. This covering machine forms the subject matter of the companion application. The main purpose and object of the invention is thus clear, namely to produce patterns having the width of the roofing material to be treated and to produce such patterns in little time and in large quantities and with very simple machinery, and to provide improved means for storing or retaining the patterns in such form that they are protected and will maintain the proper shape and smoothness so that when fed to the covering machine they will accurately fit and intimately and smoothly engage with the roofing material body.

Details of construction and operation of the cutting structure are clearly shown in Figs. 1 to 5. The supporting frame for the cutting mechanism comprises sides or standards 20 and 21 suitably braced and supported. The supporting standards each have a central vertical slot 22 faced by guide-ways 23 and 24. At the bottom of the slots are the journal boxes 25 and 25' grooved on their sides to engage with the guide-ways 23 and 24 and these boxes journal the horizontal shaft 26 which supports the cutting roll $c$. At the upper ends of these slots the journal boxes 28 and 28' engage with the guide-ways 23 and 24 and these journal boxes journal the shaft 29 which supports the abutment roll $u$. The journal boxes 28 and 28' have secured to their upper ends threaded lugs 31 and 31' for receiving the lower ends of screw shafts 32 and 32' respectively, these shafts journaling in cross walls 33 and 33' respectively and terminate above these walls in bevel gears 34 and 34' respectively engaged by bevel pinions 35 and 35' mounted on the shaft 36 journaled at its ends in brackets 37 and 37' extending from the top walls. One end of this shaft carries a hand wheel 38 and upon turning of the shaft the bevel gears will cause rotation of the screw shafts 32 and 32' and either raising or lowering of the journal boxes and corresponding movement of the abutment roll. As best shown in Fig. 7, knife blades 39 are applied to the cutting drum periphery and extend radially therefrom. Any means may be provided for thus holding the knives, blocks 40 being shown secured to the drum periphery and to whose sides the blades are secured. The blades are so arranged that as the pattern stock bands $p$ pass between the upper and lower rolls, the bands will be cut through along parallel lines so that sections are removed therefrom and narrow ribbons left, which ribbons $x$ form the skeleton pattern and on the finished product are representative of the contour of shingles or tiles. These skeleton patterns are separated and taken up by the various take-up rolls, the cut out sections dropping from the cutting roll by gravity. In order to form a better cutting abutment surface the upper roll has a shell $u'$ of wood with the grain running radially. By means of the hand wheel 38 and intermediate parts, the abutment roll can be bodily adjusted with reference to the cutting roll so that this upper roll can be raised a sufficient distance above the cutting roll to allow of ready insertion of the pattern stock bands. After such insertion the upper roll is lowered. To effect final accurate adjustment between the rolls, micrometer mechanism 27 is provided on the journal boxes 25 and 25' and act on setting studs 30 which extend up to the journal boxes 28 and 28' of the upper roll. These studs are set so that when engaged by the lowered journal boxes the rolls will be properly set with reference to each other so that the pattern stock will be propelled through the rolls and be properly cut. After setting of the studs, the upper roll can be raised at any time and after a fresh supply of pattern stock has been fed between the rolls, the journal boxes of the upper roll can be lowered until they engage the setting studs, and proper adjustment of the rolls is thus assured.

The main driving pulley 41 is secured to one end of the cutting roll shaft 26 and at its opposite end this shaft carries a transmission pulley 42 connected by belt 43 with the wide counter pulley 44 from which counter pulley a belt 45 extends into engagement with the pulley 46 on the end of the shaft 29 of the abutment roll. The belt 43 is reversed so that upon rotation of the main pulley 41 the upper and lower rolls are driven in opposite directions, and the transmission pulleys are of such dimension that they will travel at the same peripheral speed. The counter pulley 44 is mounted on a shaft 47 journaled in cross frames 48 supported at the upper ends of the vertical extensions 49 on the standards 20 and 21.

The pattern stock supporting structure is clearly shown in Figs. 1, 8, 9, 10 and 11. The supporting frame-work for this structure comprises side frames 50 and 50' having the front vertical standards 51 and 51' and the rear vertical standards 52 and 52'. The standards 52 and 52' carry on their inner faces bearing brackets 53 and 53' respectively in which are journaled at their opposite ends shafts 54 which carry the pattern paper supporting rolls 55. The bearing brackets 53' have secured to their outer ends plates 56 which engage in annular grooves 57 in the shafts 54 to prevent endwise play of the shafts. The supporting rolls 55 are also preferably removably mounted on the shafts and held in place by set screws 58 (see Figs. 16 and 17.) Journaled on the upper ends of the standards 51 and 51' is the shaft 59 for supporting the roll 60 for carrying the supply paper 61 for the various rolls 55. The roll 60 is held in place on the shaft between plugs 62 and 62', endwise play of the shaft 59 being prevented by a plate 63 engaging in the annular groove 64 of the shaft, as best shown in Fig. 10. As illustrated in Figs. 1, 2 and 5, the pattern paper bands $p$ pass from the various rolls 55 over the common guide roller $g$ and from thence the superposed bands pass through between the cutting and abutment rolls to be cut to form the pattern lengths.

Suitable mechanism is provided by means of which paper can be supplied to the various rolls 55 from the stock 61 when the rolls are empty. Referring to Fig. 9, the lower roll 55 carries at its one end a driving pulley 65 and a gear 66, the other rolls carrying gears $66^a$, $66^b$, $66^c$ and so on. Between these gears stud shafts $67^a$, $67^b$, $67^c$ and so on, carry gears $68^{a-b-c}$ for meshing with the gears of adjacent roll shafts. These various gears $68^{a-b-c}$ are adapted to be shifted from such meshing engagement, and as best shown in Fig. 11, a rocking detent 69 is provided for each gear and pivoted on a slot 70 in the corresponding shaft. When the transmission gears are slid inwardly, the inner ends of the detents will be raised and will lock the transmission gears in such meshing engagement and when the inner ends of the levers are depressed, the transmision gears may be pulled out and unmeshed from the roll gears, the shoulders 69' provided at the outer ends of the levers preventing the gears from being entirely removed from the shafts. When the machine is in operation and the filled rolls are supplying pattern stock to the cutting mechanism, the transmission gears are withdrawn so that the rolls can rotate independently. When, however, it is desired to refill the rolls, the transmission gears are shifted into mesh and the pulley 65 driven so that all the rollers are rotated. The paper from the stock roll is then first fed to the top roll 55 and when this roll is filled the upper transmission gear $68^c$ is withdrawn from meshing engagement and the paper stock then fed to the second roll, and when the second roll is filled the transmission gear $68^b$ is then withdrawn and then the lowest roll is filled.

The driving mechanism for the pulley 65 is best shown in Figs. 1, 2, 3 and 4. On the cutting roll shaft 26 just within the main driving pulley 41 is mounted a groove pulley 71. On the cutting structure supporting standards in front of the cutting roll are mounted journal boxes 72 and 72' for journaling a shaft 73 which carries at one end the friction pinion 74 for coöperating with the groove pulley 71 and at its other end carries a friction transmission wheel 75. The journal box 72 is shiftable, its base having dove-tailed engagement with the guide block 76 secured to the standard 20, as best shown in Fig. 6. On the guide block in front of the journal box up-standing ears 77 pivot one end of a shaft 78 from which extend levers 78', the other end of the shaft journaling in an extension on box 72'. Between the ears the shaft carries a cam 79 for coöperating with the journal box 72 to effect shifting thereof toward the pulley 71 upon downward movement of the levers 78'. A spring 80 is interposed between the journal box and the supporting standard and resists such inward shifting and serves to shift the box outwardly when the levers are swung upwardly. With this mechanism the pinion 74 can be shifted into driving engagement with the pulley 71 or removed therefrom, the cam engagement with the journal box being self-locking so that when the levers 78' have been swung downwardly, the journal box 72 will remain in its shifted-in position and the pinion 74 will be driven until the levers are again positively swung upwardly. On the sides of the standards 20 and 21 near the bottom thereof, bearing brackets 81 and 81' journal a shaft 82 carrying at its ends levers 83 and 83' by means of which the shaft is rotated. In front of the friction pulley 75 is the pulley 84 which receives a belt 85 extending to the pulley 65 on the pattern paper supply structure. This pulley 84 is mounted on a stud shaft 86 extending from the upper end of a frame 87 which has the extensions 88 at right angles therewith and pivoted at 89 to the adjacent supporting standard 20. In front of the lower end of the frame 87 the shaft 82 carries a cam 90 adapted to engage with the frame upon rotation of the shaft 82 by either one of its levers 78 or 78'. Such operation will cause bodily movement of the pulley 84 and frictional engagement of its belt 85 with the friction pulley 75. To enable adjustment of the cam engagement with this frame a spring abutment strip 91 on the frame is adapted to be shifted with reference to the cam by means of a screw 92. When the machine is in operation, the friction pinion 74 is withdrawn from the driving pulley 71 and the pulley 84 is withdrawn from the pulley 75. When it is desired to drive pulley 65 so that the pattern paper stock rolls may be refilled, the pinion 74 is thrown into frictional engagement with the pulley 71 in the manner described and then upon manipulation of the levers 78 or 78' the pulley 65 can be driven when desired upon shifting of the pulley 84 into engagement with the pulley 75.

The guide pulley $g$ for the various pattern blanks is mounted to be shiftable bodily to enable it to be moved so that the various pattern blanks from the refilled rolls may be more readily fed between the cutting and abutment rolls and to enable it to be pressed against the abutment roll after such feeding operation so that it may be driven by the abutment roll and the paper bands thereon positively fed between the cutting and abutment rolls. As best shown in Figs. 1 to 5, the supporting shaft 93 for the roll $g$ is journaled at its ends on frames 94 and 94' mounted on rods 95 and 95' pivoted at their lower ends to the respective supporting standards 20. Bored lugs 96 and 96' on the frames 94 and 94' receive the outer ends of the rods 97 and 97' respectively, whose outer ends are threaded to receive the threaded hubs 98 and 98' provided with hand wheels 99 and 99' respectively. Inner bifurcate ends 100—100' of the rods 97 pivot to the respective standards 20 and between these ends and the lugs through which the rods pass compression springs 101—101' are inserted. When the pattern paper bands are to be fed to the cutting mechanism the hubs 98 are unscrewed to allow the rods 95 to swing outwardly to carry the roll $g$ away from the abutment roll, and after the pattern paper bands have been properly fed to the cutting mechanism, the hubs 98 are turned to move the roll $g$ against the force of the compression springs and into proper driving engagement with the abutment roll.

In order to protect the operators of the machine against accident, a guard frame 102 is pivoted between the standards 20, 21 in front of the entrance to the cutting rolls. In order to readily shift the guard frame away from the rolls so that the pattern paper may be more readily fed to the rolls, the frame is connected to be swung outwardly when the levers 78' are moved downwardly. For this purpose the shaft 78 has an arm 103 whose end is connected by link 104 with the arm 105 associated with the guard frame. When the paper bands are to be fed to the machine from the refilled rolls 55, the machine is stopped and the abutment roll raised by the mechanism just described and the roll $g$ is swung away from the abutment roll and the levers 78' depressed to swing the guard frame downwardly. The attendant then has a clear field and can readily insert the pattern paper bands between the abutment and cutting rolls and to the take-up mechanism which will be next described. After such feeding operation, the abutment roll is again lowered into place, the roll $g$ is swung back into driving engagement with the abutment roll and the guard frame is raised into guarding position and the machine is then ready for further operation.

After passage of the pattern paper between the rolls and cutting thereof, the skeleton pattern bands are further positively conveyed and delivered to the take-up or roll-up mechanism. The skeleton pattern bands pass between the abutment and the guide roll 106 mounted on a shaft 107 journaled in frame 108—108' secured to the rods 109—109' pivoted at their lower ends to the respective standards 20. Bored lugs 110—110' in the respective frames receive the rods 111—111' whose threaded outer ends receive the hubs 112—112' provided with hand wheels 113—113'. The bifurcated ends 114 and 114' pivot to the standards 20 and between such ends and the respective lugs are the compression springs 115 and 115'. The supporting structure for the roll 106 is substantially identical with that for the roll $g$ and is controlled in the same way, being operated to remove the roll 106 from the abutment roll $u$ when a fresh supply of pattern paper is fed through the machine and being operated to press the roll 106 against the abutment roll when the machine is in operation. The take-up and roll-up mechanism for the skeleton pattern bands is best shown in Figs. 1, 12, 13, 14 and 15. The take-up structure comprises rectangular side frames 116 and 116' which have horizontal members 117 and 117' respectively. On the outer ends of the side frames brackets 118 are secured for journaling the shafts 119$^{a-b-c-d}$ of spools 120$^{a-b-c-d}$, each of which carries a roll 121 of paper. The shafts and bearing brackets coöperate to prevent endwise play of the shafts in the manner described in connection with the rolls of the supply structure S.

At the opposite sides of the frames 116—116' brackets 122$^{a-b-c-d}$ each support a shaft 123 mounting take-up spool 124. Drive mechanism is provided for driving the various take-up spools. Each shaft 123 carries a gear 125 and between the gears of the various take-up rolls transmission gears 126 are mounted on stub shafts 127 so that driving of one gear will effect drive of all the others. I preferably provide friction drive mechanism whose speed can be accurately adjusted as this is necessary in order to prevent tearing of the delicate skeleton pattern bands. Secured to the cross member 117 of the side frame 116 is a U-frame 128 between the outer ends of whose limbs 128' and 128'' is secured a slide bar 129 for carrying a slide frame 130. The inner end of this slide frame receives the drive shaft 131 parallel with the bar 129 and journaled in the limbs 128' and 128''. Interposed between the frame 130 and the shaft 131 is a bushing 132, a key 133 in said bushing engaging in key-way 131' of the shaft so that the frame together with the bushing may be shifted along the shaft but so the bushing must rotate with the shaft. The bushing extends to one side of the frame 130 and there mounts a friction pinion 135 for coöperating with the friction disk 135 secured to the adjacent end of shaft 136 journaled in the frame 128 and at its other end is journaled in the bearing frame 137 secured to the cross member 117' of side frame 116'. The shaft 136 extends beyond the side frame 116' and engages in a thrust bearing head 138 carried by the bracket 139 secured to the crossmember 117'. Between the head 138 and the bearing frame 137 the shaft has keyed thereto the driving gear 140 which meshes with the adjacent transmission gear 126. A yieldable bearing abutment 141 is interposed between the shaft 136 and the set screw 142 so that the shaft 136 may be adjusted to carry the friction disk 135 into more or less firm engagement with the pinion 134 and to take up any wear. An abutment roller 143 may also be provided for receiving the outer edge of the friction disk so as to maintain balance of the disk and prevent undue friction on the various bearings.

The outer end of the shaft 131 carries a driving pulley 144 which in practice is connected with a suitable driving source as belt 144' which has clutch teeth 145 for coöperating with the clutch teeth on the clutch sleeve 146 keyed to the shaft. In order to prevent unclutching of the sleeve when the machine is operating, a detent finger 147 is provided for engaging between the outer end of the clutch sleeve and an abutment collar 148 at the end of the shaft. This finger is pivoted in a bracket 149 secured to the adjacent side frame 116 and is pressed downwardly by a spring 150. When it is desired to unclutch the collar a finger is raised and the collar shifted outwardly.

In order to readily shift the frame 130 to thereby adjust the pulley 144 radially along the disk 135, a screw shaft 151 is provided which is rotatably anchored in a bearing bracket 152 secured to the frame 116 and which threads through a lug 153 extending upwardly from the frame 130, the outer end of the shaft being provided with a hand wheel 154.

The structure R just described is mounted at the right of the cutting mechanism and coöperates with rolls 106 and 155$^{a-b-c}$ on the cutting structure. The roll 106 has already been described and the rolls 155$^{a-b-c}$ are each journaled at their opposite ends in bearing plates 156—156' (Fig. 4), which plates are mounted on supporting standards 157—157' mounted on the side frames 20, such mounting being adjustable. Each bracket is adjustably mounted by virtue of slots 158 therein and screws 159 extending through these slots into engagement with the respective supporting standards.

Describing now the travel of the take-up paper, the paper from the lower supply roll 120 passes about a guide roller 160 pivoted between the side frames 116 and 116', then about the guide roller 106 from the bottom to the top thereof, the paper then passing about the lower take-up roll 124. The paper from the next supply roll 120 passes over the guide roller 161, then below guide roller 162, thence upwardly about guide roller 155$^a$ and then to take-up roll 124$^a$. The paper from the next supply roll 120 passes below guide roller 163 and over guide roller 164 and upwardly about guide roll 155$^b$ to take-up roll 124$^b$. Paper from the top supply roll 120 passes below the roller 165, above roller 166 and upwardly about roller 155$^c$ and to the upper in-take roll 124$^c$. The various guide rollers 162, 164, 165 and 166 are supported between the brackets 167 extending from the side frames 116 and 116'.

The take-up operation is apparent from the above description of the mechanism. The friction driving mechanism for the take-up rolls is accurately gaged to accord with the rate of travel of the superposed pattern skeleton bands about the roll 106. When the pattern paper blanks are fed through the machine the ends thereof are carried all the way to the in-take rolls so immediately upon operation of the machine, the intake-rolls will grip the ends of the bands. The lowermost band is conveyed to the lower in-take roll 124 and is supported on the section of the take-up paper traveling to the roll from the top of roll 106. The next to the bottom pattern band is fed to the in-take roll 124$^a$ and is supported on the section of the in-take paper traveling to the lower side of the roll 124$^a$ from the top side of roll 155$^a$. In the same manner the next pattern bands are conveyed respectively to the roll 124$^b$ and 124$^c$, and when the machine operates the skeleton pattern bands are supported and held smooth on the sections of in-take paper between the cutting mechanism and the in-take rolls and when they reach the in-take rolls they are accurately and smoothly wound up between the turns of in-take paper on the roll. These in-take rolls are constructed as shown in Fig. 16, having a core removable from the supporting shaft so that after a series of in-take rolls are filled they can be stored away until they are inserted in the coating machine to there deliver to the roofing material body the delicate skeleton patterns in smooth condition and in accurate alinement.

In order to give the take-up paper bands or belts sufficient tension, a brake wheel may be provided on each of the supply roll shafts and an adjustable brake band applied thereto, such brake mechanism to be of any well known construction.

It is evident that with the above described method and means the most delicate patterns can be safely and accurately rolled up and can be delivered from the rolls to the roofing material in smooth condition and with the greatest accuracy.

Changes and modifications are of course possible and I do not therefore desire to be limited except as appears in the claims which are as follows:

1. In machinery of the class described, the combination with pattern cutting mechanism, of means for feeding a pattern stock band to said cutting mechanism, a band of backing material, means for superposing the resulting pattern strip on said backing band, and means for rolling into a roll the backing band and the pattern strip superposed thereon.

2. In machinery of the class described, the combination with cutting mechanism, of means for feeding a plurality of pattern stock bands to the cutting mechanism to be simultaneously cut thereby to produce pattern strips, a plurality of in-take rolls, means for winding bands of backing material on said in-take rolls, and means for feeding one of said pattern strips to each of said backing bands to be wound up therewith into a roll.

3. In machinery of the class described, the combination of upper and lower rolls, one of which is provided with cutting edges, of means for feeding a plurality of superposed blanks of pattern stock paper through said rolls to be punctured by the cutting edges and to issue from said rolls in the form of pattern lengths, a plurality of lengths of backing paper, and means for causing each one of said pattern lengths to be wound up into a roll with one of said backing paper lengths.

4. In machinery of the class described, the combination with cutting rolls, of means for feeding a plurality of superposed pattern blank lengths through said rolls to have sections cut therefrom to leave pattern lengths, a plurality of in-take rolls for winding up a length of backing material, each of said backing material lengths arranged to have superposed thereon one of the skeleton pattern strips to be rolled therewith about its in-take roll.

5. In machinery for cutting and arranging patterns, the combination with pay out mechanism, cutting mechanism and take-up mechanism, of means for superposing a plurality of blank lengths fed from the pay-out mechanism, means for actuating the cutting mechanism to cut sections from the superposed blank lengths to thus produce superposed pattern lengths, means for separating the pattern lengths and for directing them to the take-up mechanism, and means forming part of the take-up mechanism for individually rolling up the pattern blanks.

6. In machinery for cutting and arranging patterns, the combination with pay-out mechanism, cutting mechanism and take-up mechanism, of means for superposing a plurality of blank lengths fed from the pay-out mechanism, means for actuating the cutting mechanism to cut sections from the superposed blank lengths to thus produce superposed pattern lengths, means for separating the pattern lengths and for directing them to the take-up mechanism, and means forming part of the take-up mechanism for individually winding up the pattern lengths into rolls together with backing material lengths.

7. In machinery for cutting and arranging pattern lengths, the combination of a supply structure having a plurality of pattern stock rolls journaled thereon, a cutting structure comprising cutting mechanism and means for driving same, a guide roller for receiving the various pattern lengths from the supply rolls for guiding said blanks in superposed arrangement into the cutting mechanism, said lengths being cut upon passage through the cutting mechanism to emerge therefrom as pattern lengths, a take-up structure comprising a plurality of in-take rolls and means for driving same, means for feeding backing material lengths to said take-up rolls, and means for guiding said pattern lengths each to one of said in-take rolls to be wound simultaneously thereon with the backing material lengths.

8. In machinery of the class described, the combination of an abutting roll and a cutting roll, knives disposed on said cutting roll, means for feeding a length of pattern stock between said rolls, means for rotating said rolls to effect cutting of the fed-in blank length whereby a pattern length will emerge from the roll, an in-take roll and means for rotating same, a supply roll for backing material, said backing material being fed to the take-up roll to be wound up thereon, and means for guiding said pattern length to said in-take roll to be wound up thereon between the turns of the backing material.

9. In machinery of the class described, the combination of cutting mechanism comprising an abutment roll and a cutting roll, said cutting roll being provided with radially extending knives, a guide roller adjacent the entrance side of said rolls, means for feeding a plurality of superposed pattern blank lengths to said guide roller, a guide roller adjacent the exit side of said rolls, said superposed lengths passing over said guide rolls and about said abutment roll to be cut by said knives upon driving of said rolls, means for each guide roll for effecting bodily movement thereof into engagement with the abutment roll, and an in-take roll for each pattern length for receiving same after passage thereof through the cutting mechanism.

10. In machinery of the class described, the combination of cutting mechanism comprising an abutment roll and a cutting roll, said cutting roll being provided with radially extending knives, a guide roller adjacent the entrance side of said rolls, means for feeding a plurality of superposed pattern blank lengths to said guide roller, a guide roll adjacent the exit side of said rolls, said superposed lengths passing over said guide rolls and about said abutment roll to be cut by said knives upon driving of said rolls, means for each guide roll for effecting bodily movement thereof into engagement with the abutment roll, a plurality of in-take rolls, means for driving said rolls, means for feeding to each roll a length of backing material, and means for guiding each of the pattern lengths from the exit side guide roll to one of said in-take rolls to be wound up on the latter together with the backing material.

11. In machinery of the class described, the combination of means for simultaneously cutting a plurality of pattern lengths, and means for winding up each pattern length together with a length of backing material.

12. In machinery of the class described, the combination with cutting mechanism, of means for feeding a plurality of superposed pattern blank lengths to said cutting mechanism, means for operating said cutting mechanism to cut said superposed blank lengths to leave superposed pattern lengths, means for separating said pattern lengths, winding rolls, bands for guiding the separated pattern lengths to said rolls, and means for driving said rolls whereby each will wrap up a pattern length together with the guiding band.

13. In machinery for cutting and winding pattern lengths, the combination with a cutting means, of means for winding up the pattern length so cut with a length of backing material.

In witness whereof, I hereunto subscribe my name this 4th day of December, A. D. 1912.

SOLOMON H. GOLDBERG.

Witnesses:
 MARK D. GOODMAN,
 CHARLES J. SCHMIDT.